US008935082B2

(12) United States Patent
Dalal et al.

(10) Patent No.: US 8,935,082 B2
(45) Date of Patent: Jan. 13, 2015

(54) VEHICLE SPEED DETERMINATION VIA INFRARED IMAGING

(75) Inventors: Edul N Dalal, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 37 days.

(21) Appl. No.: 13/357,034

(22) Filed: Jan. 24, 2012

(65) Prior Publication Data

US 2013/0191014 A1 Jul. 25, 2013

(51) Int. Cl.
*G06F 19/00* (2011.01)
*G08G 1/01* (2006.01)
*G06K 9/20* (2006.01)

(52) U.S. Cl.
CPC ............ *G08G 1/0116* (2013.01); *G06K 9/2018* (2013.01)
USPC ............................ 701/119; 701/117; 382/106

(58) Field of Classification Search
CPC ... G01N 21/359; G01N 21/314; G01N 21/84; G01N 2021/1765; G01N 2033/0085; G01N 21/35; G08G 1/054; G08G 1/04; G08G 1/017; G08G 1/0175; G08G 1/052; G01J 3/0294; G01J 3/2823; G06K 9/2018; G06T 2207/10048
USPC .................................. 701/117, 119; 382/106
See application file for complete search history.

(56) References Cited

U.S. PATENT DOCUMENTS 5,066,950 A * 11/1991 Schweitzer et al. .......... 340/937
5,381,155 A * 1/1995 Gerber .......................... 342/104
5,687,249 A * 11/1997 Kato ............................ 382/104
2002/0140924 A1* 10/2002 Wangler et al. ................ 356/28
2008/0256815 A1* 10/2008 Schafer .......................... 33/739
2010/0100275 A1* 4/2010 Mian et al. ...................... 701/29
2011/0012916 A1* 1/2011 Nelson et al. ................. 345/593
2011/0234804 A1* 9/2011 Matsuda et al. .............. 348/148
2012/0010804 A1* 1/2012 Fliegen ........................ 701/119
2012/0018634 A1* 1/2012 Vincent et al. ............ 250/338.1

OTHER PUBLICATIONS

P. R. Herrington et al, "Oxidation of Roading Asphalts", Ind. Eng. Chem. Res. 1994, 33, 2801-2809.
2.23 Analysis of black rubber using the ATR method—FTIR; http://www.shimadzu.com.br/analitica/aplicacoes/espectrofotometros/ftir/2_23.pdf (retrieved Apr. 1, 2011).

* cited by examiner

*Primary Examiner* — Helal A Algahaim
*Assistant Examiner* — Paul Castro
(74) *Attorney, Agent, or Firm* — Fay Sharpe LLP

(57) ABSTRACT

A system and method which detects and uses a point of contact between a vehicle's tire and the pavement as a reference point to improve the accuracy of vehicle speed detection in a motorized vehicle speed detection system. In one embodiment, a plurality of infrared images of a moving vehicle are received. Each of the images is separated in time by known intervals. The images are captured using an infrared camera which can be a single-band or multi-band camera which operates in an infrared wavelength band selected to enhance a contrast between the vehicle's tires and the road surface. For each image, a point of contact is determined where a same tire contacts the road surface. These points and the time interval separations are used to calculate the vehicle's speed. An alert signal is initiated to a traffic enforcement authority if the speed exceeds the road's speed limit.

22 Claims, 10 Drawing Sheets

VEHICLE SPEED DETERMINATION VIA INFRARED IMAGING

TECHNICAL FIELD

The present invention is directed to systems and methods for determining a speed of a vehicle by tracking vehicle features in a sequence of images captured over a known time interval or frame rate.

BACKGROUND

Methods for vehicle speed detection using video have many important transportation applications. For applications such as traffic speed enforcement, accurate speed detection is necessary. One method for determining a vehicle's speed is to capture two time-sequenced images of that vehicle, track a specific feature on that vehicle such as, for example, a location of the vehicle's license plate, and then calculate the vehicle's speed from trigonometric relationships. For accurate speed determination, the precise height above the road surface of the feature being tracked needs to be known in advance, unless a stereo imaging system is used, wherein pairs of images from two different positions are captured. Unfortunately, vehicle features are not placed at fixed heights across all vehicle makes and models. As such, speeds calculated by analyzing non-stereo images taken of moving vehicles tend to lack the accuracy required for law enforcement.

Accordingly, what is needed in this art are sophisticated systems and methods for quickly analyzing images of moving vehicles to determine the vehicle's speed in a practical and economically feasible manner.

BRIEF SUMMARY

What is disclosed is a system and method which detects and uses a point of contact between a vehicle's tire and the road surface for accurate speed detection. The present method uses infrared (IR) imaging to achieve a high contrast between tire and asphalt for contact-point detection thus reducing the above-described problem with respect to feature height variation across vehicles to a "zero height" thereby eliminating the trigonometric calculations for height correction altogether. As described herein in greater detail, the present invention effectuates accurate real-time vehicle speed detection via infrared image analysis.

One embodiment of the present method for determining the speed of a motor vehicle involves the following. First, a plurality of infrared images of a moving vehicle are captured using an infrared imaging system which operates in a wavelength band selected such that a contrast between the black rubber of the tire and the asphalt of the road surface is enhanced. A point of contact is determined in each of the images where a same tire of the vehicle meets the road. Contact points and time interval separations between successive images are determined and then used to calculate a speed at which the vehicle is traveling. In one embodiment, an alert signal is provided to a traffic enforcement authority if the vehicle's speed exceeds the speed limit set for that road.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method which uses infrared imaging to highlight a point of contact between a vehicle's tire and the road surface to improve the accuracy of vehicle speed determination in an automated speed detection system.

A "motor vehicle" refers to any motorized vehicle, as is known in the automotive arts, typically with an internal combustion engine which burns a fuel such as, for instance, gasoline/petrol, diesel, natural gas, methane, nitro-methane, fuel oil, or bio-fuels, including any fuel additives; and/or with an electric motor. Motorized vehicles have tires comprised of black rubber.

An "infrared Image of a motor vehicle" means infrared images of a vehicle captured using an IR imaging system. IR images are either still images captured at known points in time, or are video images captured at a known frame rate.

An "IR imaging system" is an infrared camera system designed to capture IR light reflected from a target vehicle, optionally separate it into wavelength bands, and output an IR image of that target. Such systems can include an IR (infrared) illumination system, which may comprise narrow-band IR sources (e.g., light emitting diodes (LEDs)) and/or a broad-band IR source, optionally with wavelength-band filters. The IR imaging system can be a single video camera to capture multiple frames of a moving vehicle, or one or more still cameras capable of being triggered to capture multiple images of the vehicle as the vehicle passes through the camera's field of view. The images captured by each camera may have a time stamp associated therewith.

Example IR Illumination System

Figure 1:
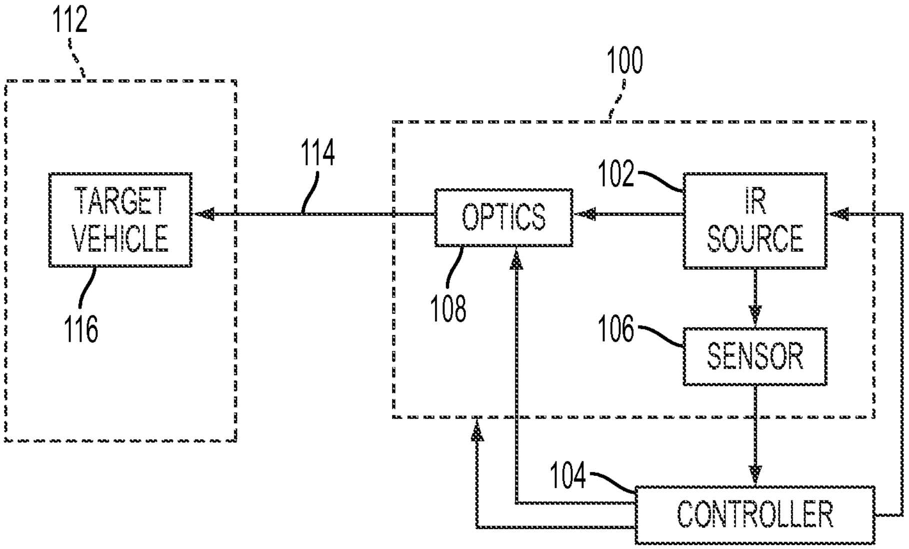
FIG. 1 illustrates one embodiment of an example IR illumination system.

Reference is now being made to FIG. 1 which illustrates one embodiment of an example IR illumination system 100.

The IR illumination system of FIG. 1 is shown comprising an IR illuminator 102, which may comprise narrow-band IR sources such as light emitting diodes (LEDs), and/or a broad-band IR source, such as a thermal source. Controller 104 is coupled to source 102 and controls the input current and, thereby, the output intensity. Sensor 106 samples the radiation emitted from the IR light source and provides feedback to controller 104. Optics 108 receives the output of IR illuminator 102 and focuses output beam 114 onto the target field of view 120, which may include the target vehicle 116. Optics 108 includes a plurality of lens positioned in the beam path to focus the beam as desired, and optionally also contains wavelength-band filters. Controller 108 may also be coupled to optics 108 to effectuate focusing and/or filter placement. Controller 108 optionally be further coupled to IR illumination system 100 to effectuate aiming of the device (pan, tilt, etc.).

Example IR Detection System

Figure 2:
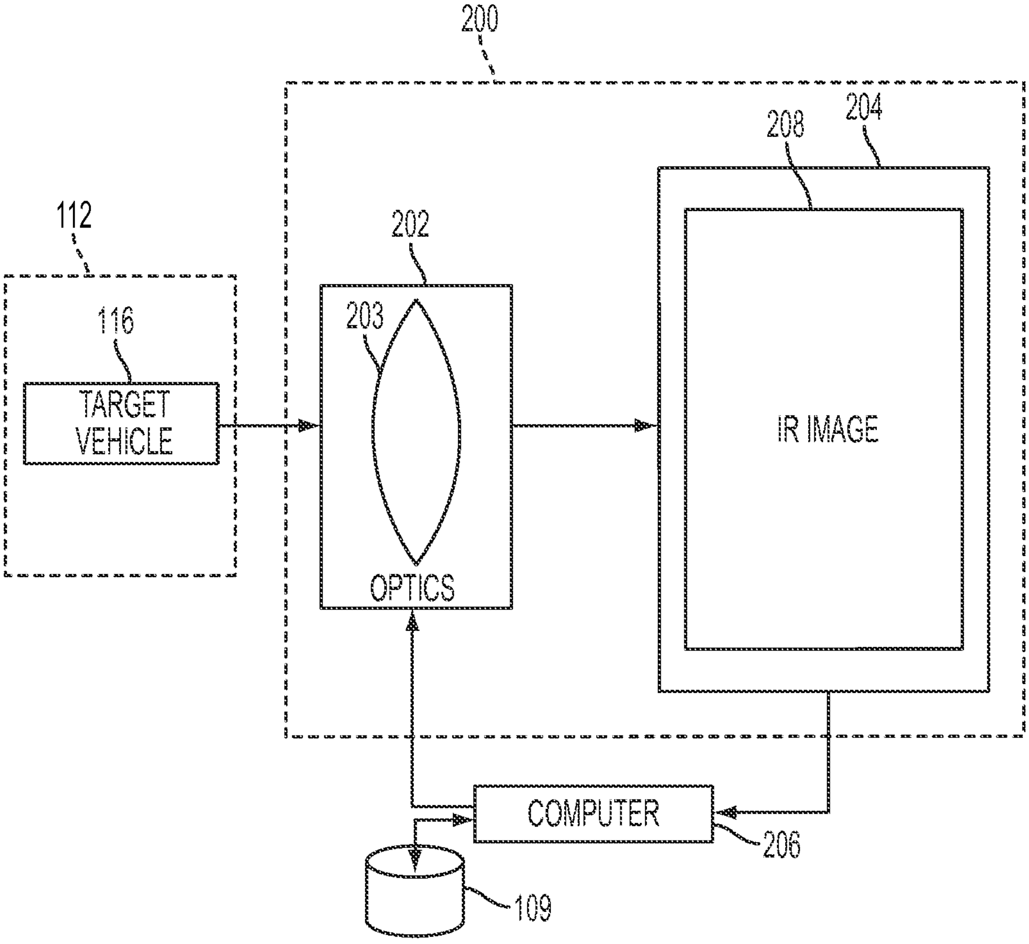
FIG. 2 illustrates one embodiment of an example IR detection system.

Reference is now being made to FIG. 2 which illustrates one embodiment of an example IR detection system 200.

Target field of view 120, which may include the target vehicle 116, reflects the IR output beam 114 emitted by the IR illumination system of FIG. 1. A portion of the reflected IR light is received by optics 202 having lens 203 that focus the received light onto sensor(s) 204 which spatially resolve the received light to obtain IR image 208. Optics 202 may also include one or more bandpass filters that only allow light in a narrow wavelength band to pass though the filter. The filters may also be sequentially changed. Sensor 204 sends the IR image information to computer 206 for processing and storage. Detector 208 is a multispectral image detection device whose spectral content may be selectable through a controller (not shown). Detector 204 records light intensity at multiple pixels locations along a two dimensional grid. Optics 202 and detector 204 include components commonly found in various streams of commerce. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixilated photomultiplier tube (PMT) detectors, InGaAs (Indium Gallium Arsenide), Mercury Cadmium Telluride (MCT), and Microbolometer. Computer 206 receives signal values associated with each pixel of IR image 208. Computer 206 may optionally be in communication with optics 202 to control the lens thereof and in communication with detector 204 to control the sensitivity thereof. Computer 206 may optionally control the IR detection system 100 to effectuate aiming of the device (pan, tilt, etc.). In the case of a system capturing a series of still images, computer 206 also controls optics 202 and/or detector 204 to determine when the still images are to be captured.

The IR illumination system of FIG. 1 and the IR detection system of FIG. 2, collectively comprise an IR camera system. One or more such camera systems comprise an imaging system used to capture still or video images of a same tire of a target motor vehicle.

Example IR Imaging System

Figure 3:
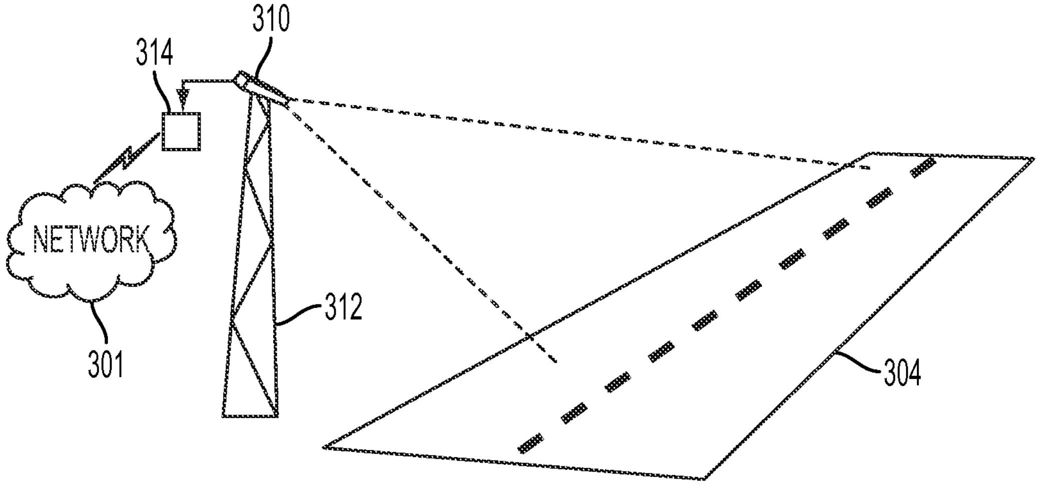
FIG. 3 illustrates one example embodiment of the deployment of an IR imaging system.

Reference is now being made to FIG. 3 which illustrates one example embodiment of the deployment of an IR imaging system.

In FIG. 3, motor vehicles (not shown) travel along road 304. Positioned alongside road 304 or directly above the road (not shown) is an IR camera system 310, which may be mounted on a post, gantry, or similar structure 312. The IR camera system 310 is capable of capturing still or video images of a motor vehicle as the vehicle passes into the camera's field of view. Also shown associated with the IR camera is a controller 314. The controller and IR camera of FIG. 3 are in communication with one or more remote devices such as, for instance, a workstation (of FIG. 4) over network 301. Such communication may be wired or wireless. Various devices can also be placed in communication with any of the controllers of FIG. 3 over network 301 so that various aspects of the controllers such as timing signals, sensitivity settings, and the like, can be monitored, modified, or otherwise controlled. Such devices may also be placed in bi-directional communication with the IR camera of FIG. 3 using network 301 such that various aspects of the cameras such as the camera angle, tilt, rotation, field of view, lens speed, focus, and the like, can also be monitored, modified, or otherwise controlled, including receiving the images captures by such devices. In one embodiment, controller 314 may include a computer to perform some of the functions of analyzing the IR images and determining the speed of target vehicles passing by, using the disclosed method. In another embodiment, the analysis of IR images may be processed elsewhere through the networked computers mentioned below.

Example Networked Embodiment

Figure 4:
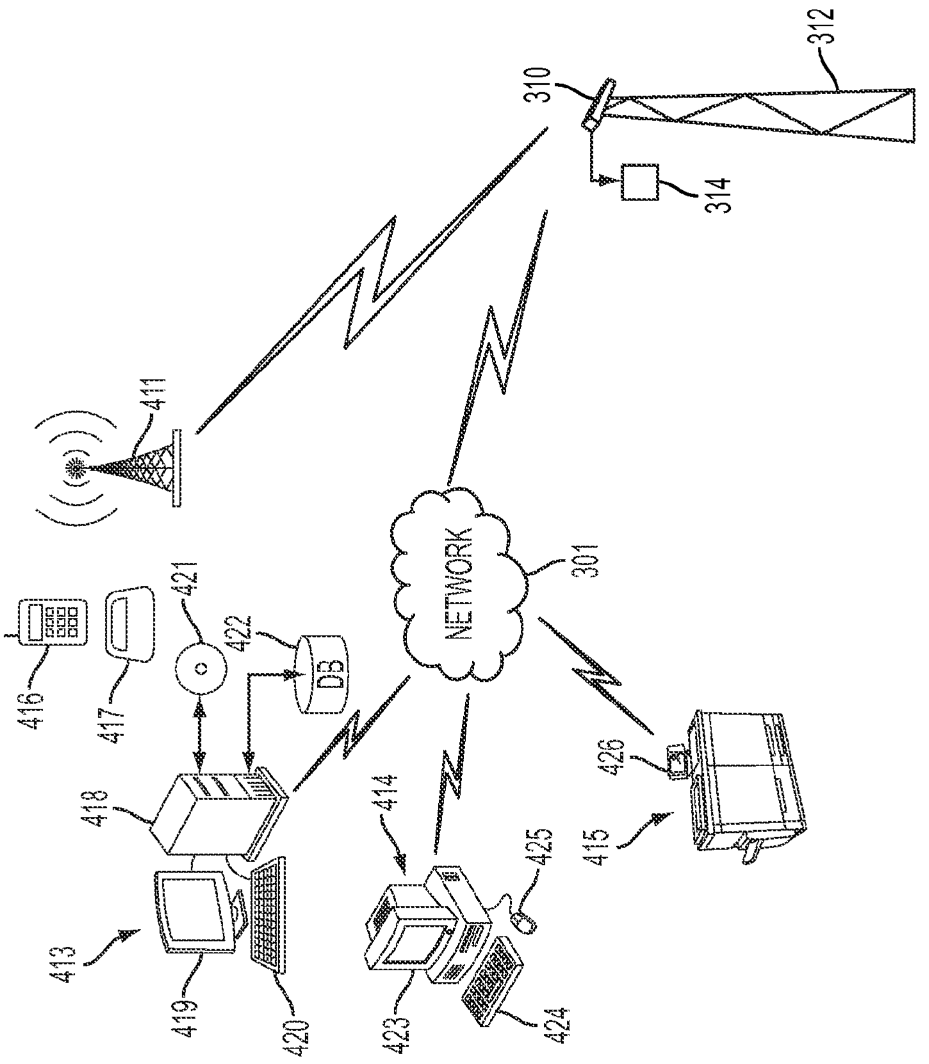
FIG. 4 illustrates the embodiment of FIG. 3 wherein further aspects of the present system are shown and described.

Reference is now being made to FIG. 4 which illustrates the embodiment of FIG. 3 wherein further aspects of the present system are illustrated.

IR camera system 310 and controller 314 may incorporate wired and/or wireless elements and may be connected via other means such as cables, radio, or any other manner for communicating known in the arts. Network 301 can receive signals transmitted from tower 411 and wirelessly communicates those signals to any of: workstation 413, graphical display device 414, and/or multi-function print system device 415. Signal transmission system 411 is also in wireless communication with handheld cellular device 416 and tablet 417. Workstations 413 and 414 are in communication with each other and multi-function document reproduction device 415 over network 301 including devices 416 and 417 and IR camera system 310 and controller 314. Such a networked environment may be wholly incorporated within the confines of a single building or may be distributed to different locations throughout a widely dispersed network. Aspects of network 301 are commonly known and may include the World Wide Web. A further discussion as to the construction and/or operation of a specific network configuration has been omitted. Suffice it to say, data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway.

Computer workstation 413 is shown comprising a computer case 418 housing a motherboard, CPU, memory, interface, storage device, and a network card. The computer system may also include monitor 419 such as a CRT, LCD, or touchscreen device. An alphanumeric keyboard 420 and a mouse (not shown) may effectuate a user input. Computer readable media 421 carries machine readable program instructions for implementing various aspects of the present method. Workstation 413 communicates with database 422 wherein various records are stored, manipulated, and retrieved in response to a query. Although the database is shown as an external device, the database may be internal to computer case 418 mounted on the hard disk therein. A record refers to any data structure capable of containing information which can be indexed, stored, searched, and retrieved in response to a query, as are well established in the software arts. The workstation is capable of running a server or housing server hardware for hosting installed applications. The workstation is capable of creating and running service proxies for directing requests for applications from a client device to the platform hosting the requested application and for redirecting responses from a host device to a requesting client device. The workstation may act as a server to processors resident aboard the controller 314 or the camera system 310. Workstation 413 may be any of a laptop, server, mainframe, or the like.

Workstation 414 is shown comprising display device 423 for the presentation of various captured images thereon for a visual review by a user or technician of the systems of FIGS. 3 and 4 using keyboard 424 and mouse 425. The keyboard and mouse further enables a user to manipulate any aspect of the images captured in accordance with the teachings hereof.

Document reproduction device 415 is shown comprising a color marking device having a user interface 426 for the visual display of images and for enabling the user to configure the print system device to any of a plurality of device specific settings. Printer 415 may be used to reduce one or more of the captured video images and/or one or more of the reconstructed video images to a hardcopy print. The hardcopy print can be provided, for example, to the motorist as evidence of the speed violation. All of the devices of FIG. 4 collectively form a network. It should be appreciated that any of the devices shown in FIG. 4 can be placed in communication with any of the other devices of FIG. 4 shown in the networked configuration.

Example Captured IR images

Figure 5:
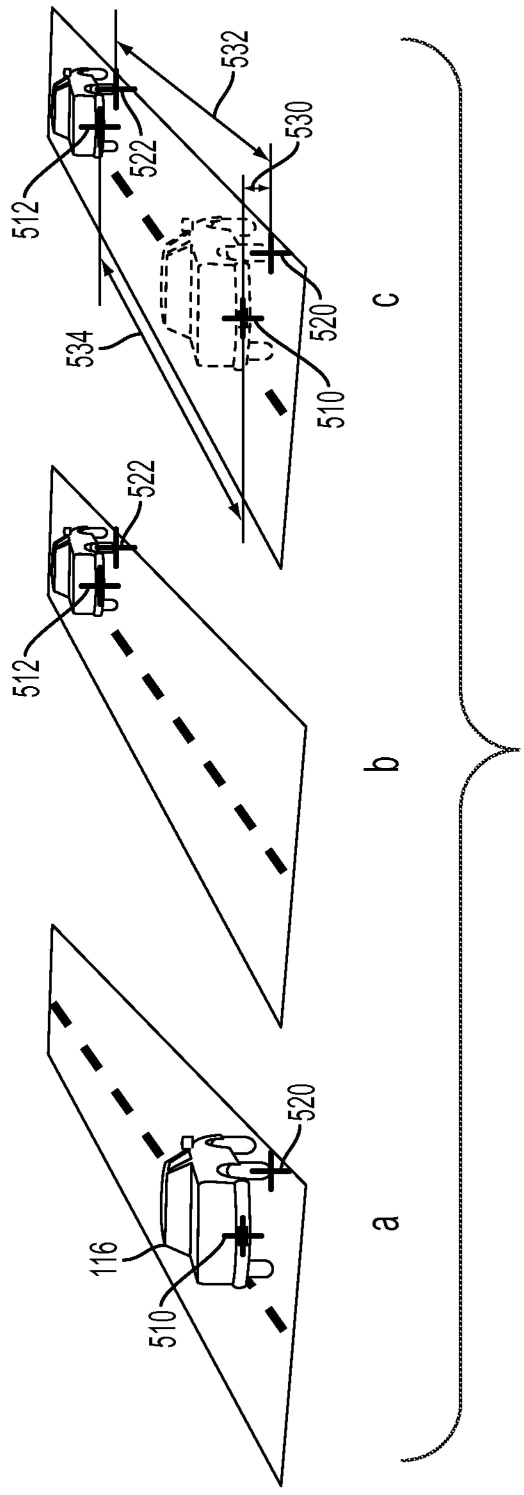
FIG. 5 shows two IR images captured at different times of a target moving vehicle using the system of FIGS. 3 and 4.

Reference is now being made to FIG. 5, which is a series of three related FIGS. 5*a*, 5*b* and 5*c*. FIG. 5*a* and FIG. 5*b* show two IR images captured of a target vehicle 116 travelling on a road 304, using the IR imaging system shown and discussed with respect to the embodiments of FIGS. 3 and 4. The IR images may be still images that are captured at different times, or they may be separate frames taken from a video sequence. Using standard calibration procedures, pixels within these images may be converted to real-world coordinates. However, since a 3-dimensional real-world scene is projected onto a 2-dimensional image, there is inherently some loss of information, unless a stereo imaging system is used, wherein pairs of images from two different positions are captured. The discussion here is limited to non-stereo images. Using procedures known in the art, it is possible to uniquely determine two of the dimensions if the third dimension is known. For example, if the height (z-axis) of a feature is known, the coordinates along the other two axes (x- and y-axes) can be computed.

Therefore, by selecting a feature on the vehicle of known height, it is possible to compute the (x,y) coordinates of that feature. While any clearly-defined feature of the target vehicle may be used, it is common to use a corner of the vehicle's license plate, since this feature is present on virtually all vehicles, and is easily extracted automatically from the image using standard machine-vision algorithms. The top left corner of the license plate is shown marked by a cross-hair pattern 510 in FIG. 5*a* and correspondingly by the cross-hair pattern 512 in FIG. 5*b*. These two images are superposed in FIG. 5*c*. If the height 532 of this feature (510, 512) is known, the (x,y) coordinates can be computed in each of the two images, and from these coordinates, the distance travelled 532 can be determined. Since the time interval between the two images is known accurately, it is possible to calculate the speed of the target vehicle 116, by dividing the distance by the time.

The accuracy of the resultant calculated speed is dependent on the accuracy with which the height 532 of the feature is known. The height of the license plate can vary significantly from one vehicle to the next, for example, the license plate can be mounted at one height on an SUV and on a very different height on a sports car. Consequently, if an average height is assumed, it may be in significant error, resulting in significant error in the calculated speed of the vehicle. Other features than the license plate may be used, but they all suffer from the same variability. One way to avoid this variability is to use as the tracked feature the point of contact (520, 522) of a tire of the vehicle with the road. This feature, uniquely, is always at zero height for all vehicles, and can therefore provide accurate speed calculations.

In one embodiment, more than two images are used to calculate the speed of a given target vehicle 116, in order to reduce measurement noise. For example, it is usually desirable to calculate the coordinates of a desired feature over several points in time, and to estimate the average speed of the vehicle from the plurality of coordinates. This is particularly true for curved roads, or in cases where the vehicle changes lanes.

Although the use of the point of contact (520, 522) of a tire of the vehicle with the road as a zero-height feature enables more accurate speed measurement, in practice, it is often difficult to automatically and reliably extract said point of contact, using visible light images. This is due to the low image contrast that can exist between the tire and the road, in particular an asphalt road, since often both the tire and the road are black. This problem is accentuated in conditions of extreme weather, and at night.

Absorbances of Asphalt and Black Rubber

Figure 6:
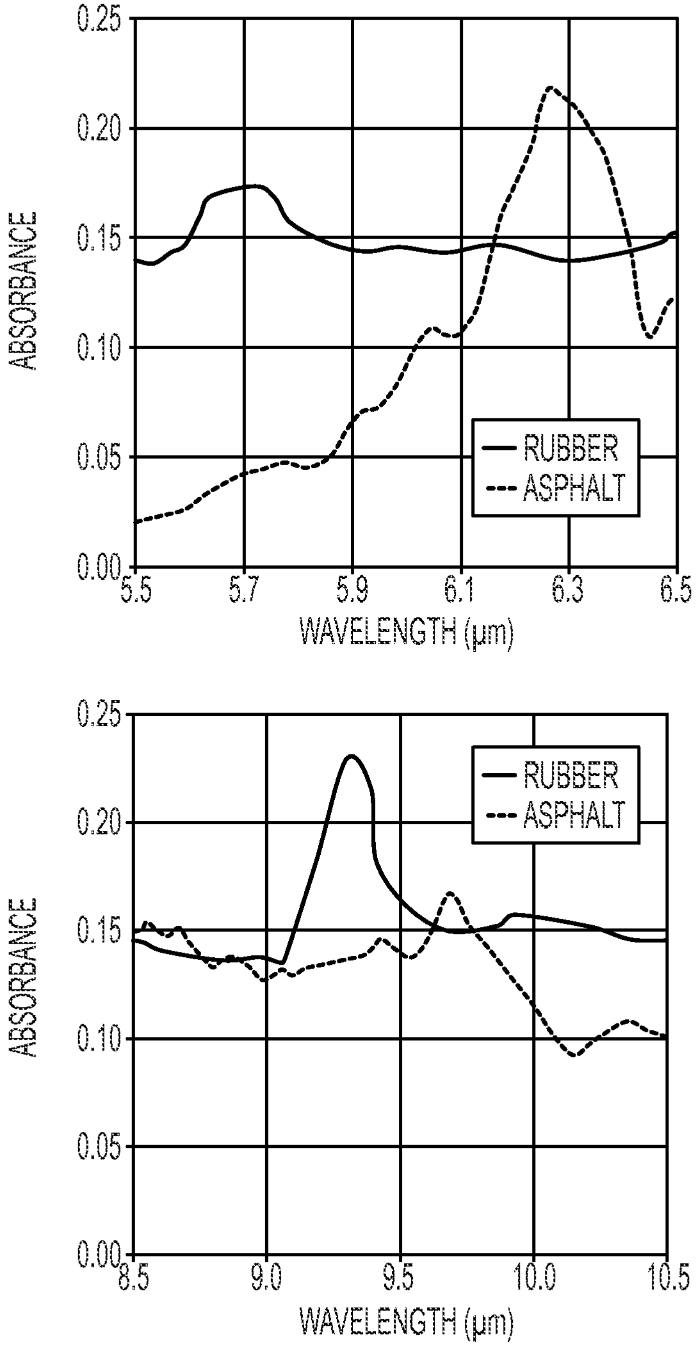
FIG. 6 shows an example of infrared absorbances of asphalt and black rubber at specific infrared wavelength bands.

Reference is now being made to FIG. 6 which shows example infrared absorbances of both asphalt and black rubber at specific infrared wavelength regions.

At infrared wavelengths below about 6.1 μm, asphalt has significantly lower absorbance than black rubber. As such, video images captured at these wavelengths have good contrast with the vehicle tires appearing significantly darker than the asphalt. This contrast is used herein to effectuate precise detection of the point of contact of a tire with asphalt pavement to obtain a reliable "zero height" feature for the vehicle thereby overcoming the above-described problem in this art to which the present invention is directed. A similar situation exists at wavelengths between about 9.1 μm and 9.5 μm. The opposite effect is seen at wavelengths between about 6.2-6.4 μm where the tires appear lighter than the asphalt. This, however, again provides the necessary contrast required to effectuate the method hereof. Note too that at other infrared wavelengths there might be little or no contrast achieved between the tires and the asphalt pavement, such as the region of 8.5 to 9.1 μm. Similar contrast can be obtained using specific wavelength bands of other road surface materials such as, for instance, concrete, gravel, dirt, and the like, which provide a good visual contrast with black rubber. It should be appreciated that the infrared spectrum of rubber is commonly measured either by measuring the liquid components obtained by a dry distillation method using a liquid cell, or by direct measurement using an Attenuated Total Reflection (ATR) method. Because black rubber contains a lot of carbon, KRS-5 or ZnSe prisms do not perform as well as a Ge prism with a higher refractive index. However, when a Ge prism is used to measure black rubber, the peak intensity tends to be weakened and the baseline of the absorbance spectrum tends to rise. Therefore, the intensity should be corrected after measurement with a reciprocal of the wavelength to bring it closer to the transmittance spectrum.

It is not necessary to have the absorbance data for the specific materials available before-hand. In practice, the appropriate wavelength band(s) can be derived via on-site experiments. For example, one may put the IR camera system 310 on-site with several narrow band filters and make multiple experimental image captures of various vehicles for each filter band. Then, based on an analysis of the contrast of tire vs. road in these captured images, optimal wavelength band(s) can be derived. Once the bands are selected, they can be implemented in the IR camera system 310 at the given site with the proposed speed detection algorithm.

Flow Diagram of One Example Embodiment

Figure 7:
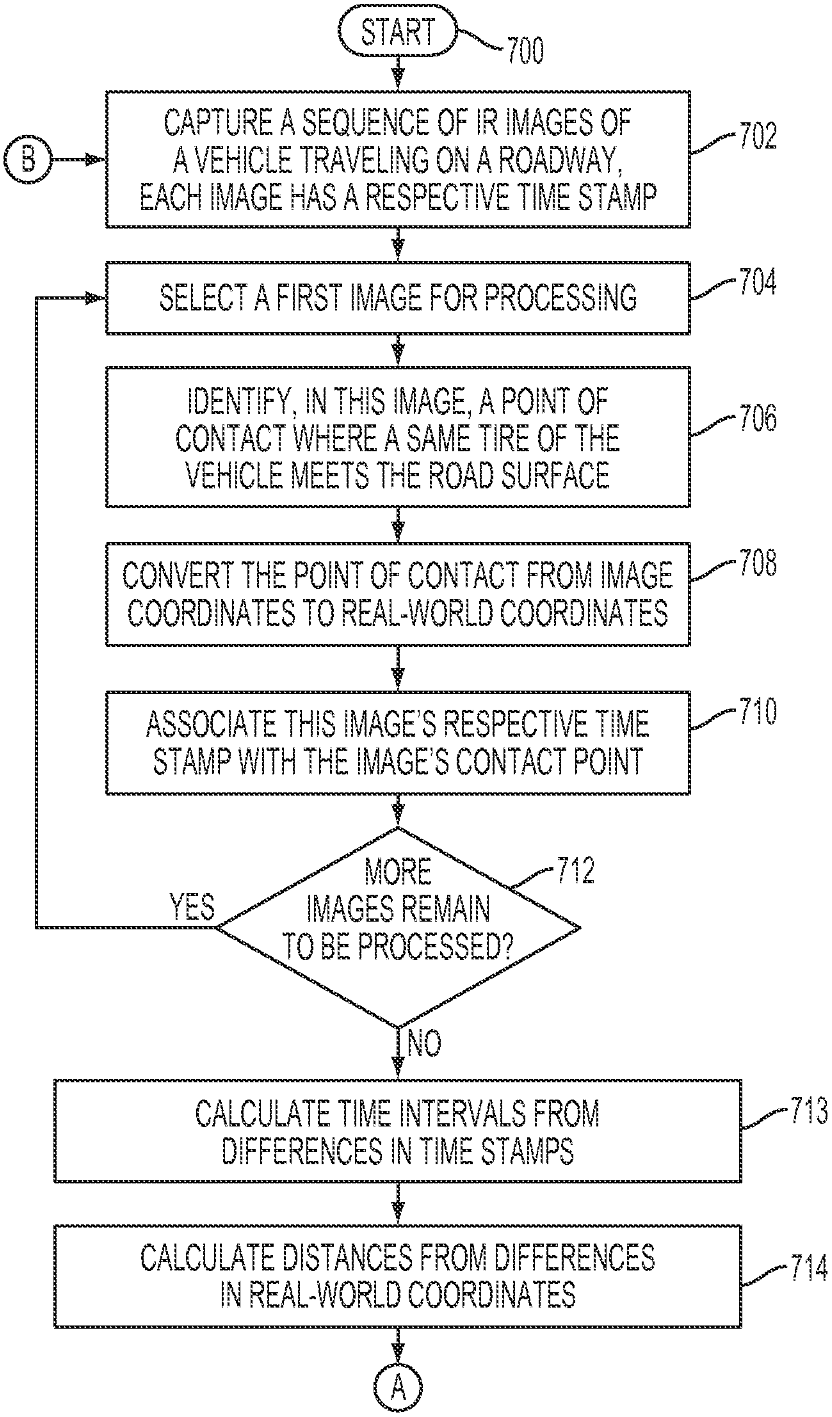
FIG. 7 is a flow diagram which describes one example embodiment of the present method for determining the speed of a motor vehicle using an IR imaging system.

Reference is now being made to the flow diagram of FIG. 7 which illustrates one example embodiment of the present method for determining the speed of a motor vehicle in a vehicle speed enforcement system. Flow processing begins at 700 and immediately proceeds to step 702.

At step 702, capture or otherwise receive a plurality of infrared images of a motor vehicle traveling on a road surface. The images are separated in time by known intervals. Example IR images captured of a vehicle's same tire which are separated in time by known time intervals are shown and discussed with respect to FIG. 5. These infrared images have been captured using an infrared imaging system which operates in an infrared wavelength band selected such that a contrast between the tires of the vehicle and the road surface is enhanced in the images. The infrared imaging system can comprise either a single-band or a multi-band infrared camera. The infrared wavelength band preferably includes a portion of the electromagnetic spectrum between 0.7 μm and 9.7 μm in wavelength.

At step 704, select or otherwise identify a first image of the sequence of captured images for processing. The first image has been captured at a first point in time which must be different than each successive image.

At step 706, identify a point of contact in this image where a same tire of the vehicle contacted the road surface, and determine the image coordinates of this point of contact. Example points of contact are discussed with respect to contact points 520, 522 of the images of FIG. 5.

At step 708, convert the image coordinates of the point of contact, determined in step 706, into real-world coordinates, using camera spatial calibration procedures known in the art. At step 710, associate this image's time stamp with this point of contact.

At step 712, a determination is made whether any more images in the sequence of captured images remain to be processed. If so then processing repeats at step 704, wherein a next image of the sequence of captured images is selected or otherwise identified for processing. Processing repeats in such a manner until a sufficient number of images have been processed to effectuate a determination of the vehicle's speed in accordance with the methods hereof. If, at step 710, all the images have been processed, then processing continues with respect to step 713.

At step 713, calculate time intervals between the various images from the time stamps of each of the captured images.

At step 714, calculate distances between the points of contact of the various images from the differences in real-world coordinates of the points of contact of the captured images.

Figure 8:
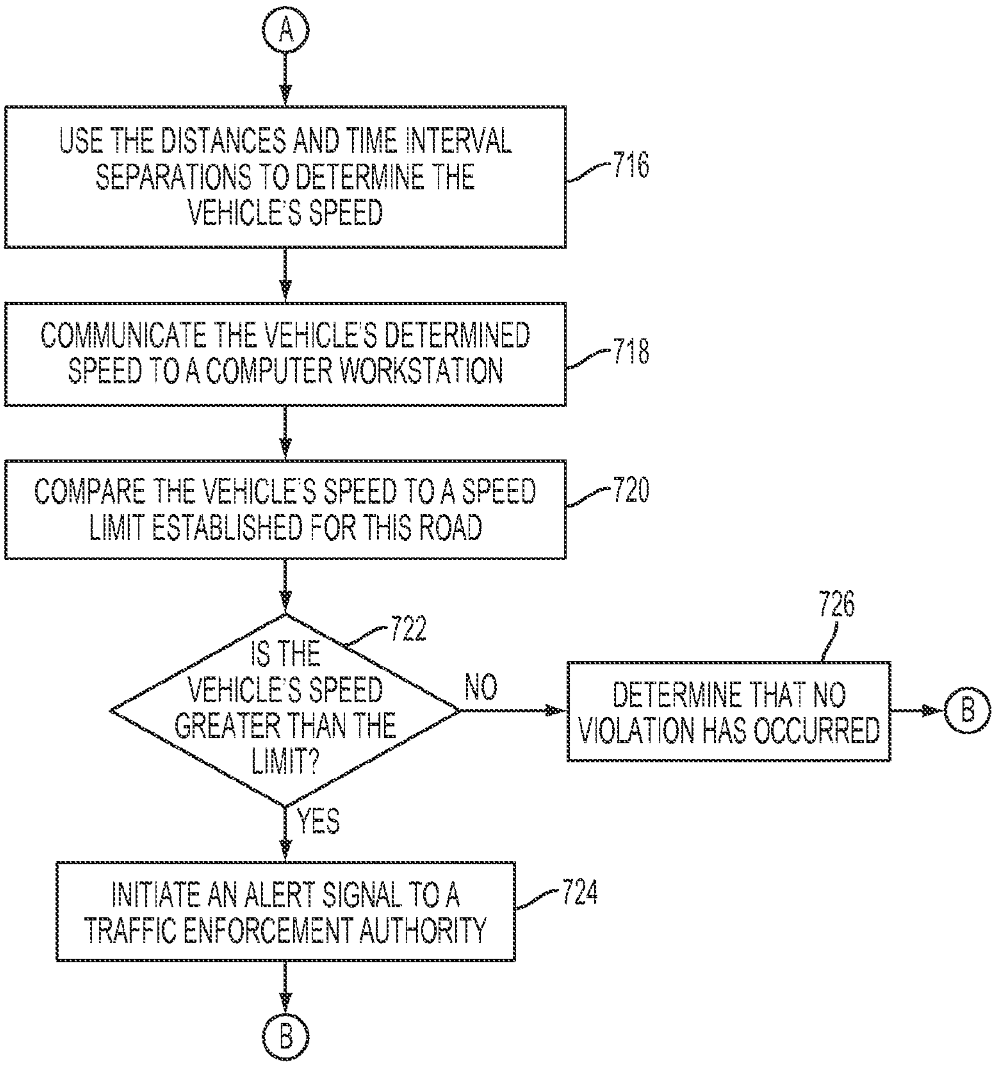
FIG. 8 is a continuation of the flow diagram of FIG. 6 with processing continuing with respect to node A.

Reference is now being made to the flow diagram of FIG. 8 which is a continuation of the flow diagram of FIG. 7 with flow processing continuing with respect to node A.

At step 716, determine the vehicle's speed as it travels down that particular road using the calculated distances and time interval separations. Between any pair of images, this determination can be readily effectuated using the relationship that distance=rate×time, i.e., speed is the amount of distance the vehicle traveled divided by time interval separation. In one embodiment, the determined vehicle speed may be in the form of a speed profile, i.e., a collection of speed measurements, when the number of captured images is greater than two. This information may provide additional information about the driving pattern, in terms of acceleration/deceleration of the target vehicle. In another embodiment, the determined vehicle speed is at least one of the average, median, maximum, and minimum of the multiple speed measurements if the number of captured images is greater than two.

At step 718, communicate the vehicle's rate of speed to a computer system such as the workstation of FIG. 4.

At step 720, compare the vehicle's speed to a speed limit established for this road.

At step 722, a determination is made whether the vehicle's determined final speed is greater than the speed limit established for this road. If so then, at step 724, an alert signal is initiated to a traffic enforcement authority, in response to the vehicle exceeding the speed limit. Law enforcement can then isolate the license plate number of this vehicle and issue a traffic citation to the registered owner of the vehicle. Thereafter, flow processing continues with respect to node B wherein, at step 702, another sequence of IR images of another motor vehicle is captured or is otherwise received and processing repeats in a similar manner for these next set of IR images. On the other hand, if it is determined that this vehicle is not exceeding the speed limit then, at step 726, it is determined that no speed violation has occurred. These images may be stored to a storage device for a predetermined amount of time or summarily discarded. In this embodiment, flow processing continues with respect to node B wherein, at step 702, the system is ready to process another set of time-sequenced IR images of a motor vehicle intended to be processed for speed determination.

Although it is not stated explicitly above, in some cases it is possible that more than one vehicle can be captured in the same image(s). It should be understood that the process described in FIG. 7 and FIG. 8 would process the segmentation of images for each captured vehicle to get their individual speeds and determine individual speed violations.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable instructions in communication with various components of a vehicle occupancy detection system.

Block Diagram of Image Processing System

Figure 9:
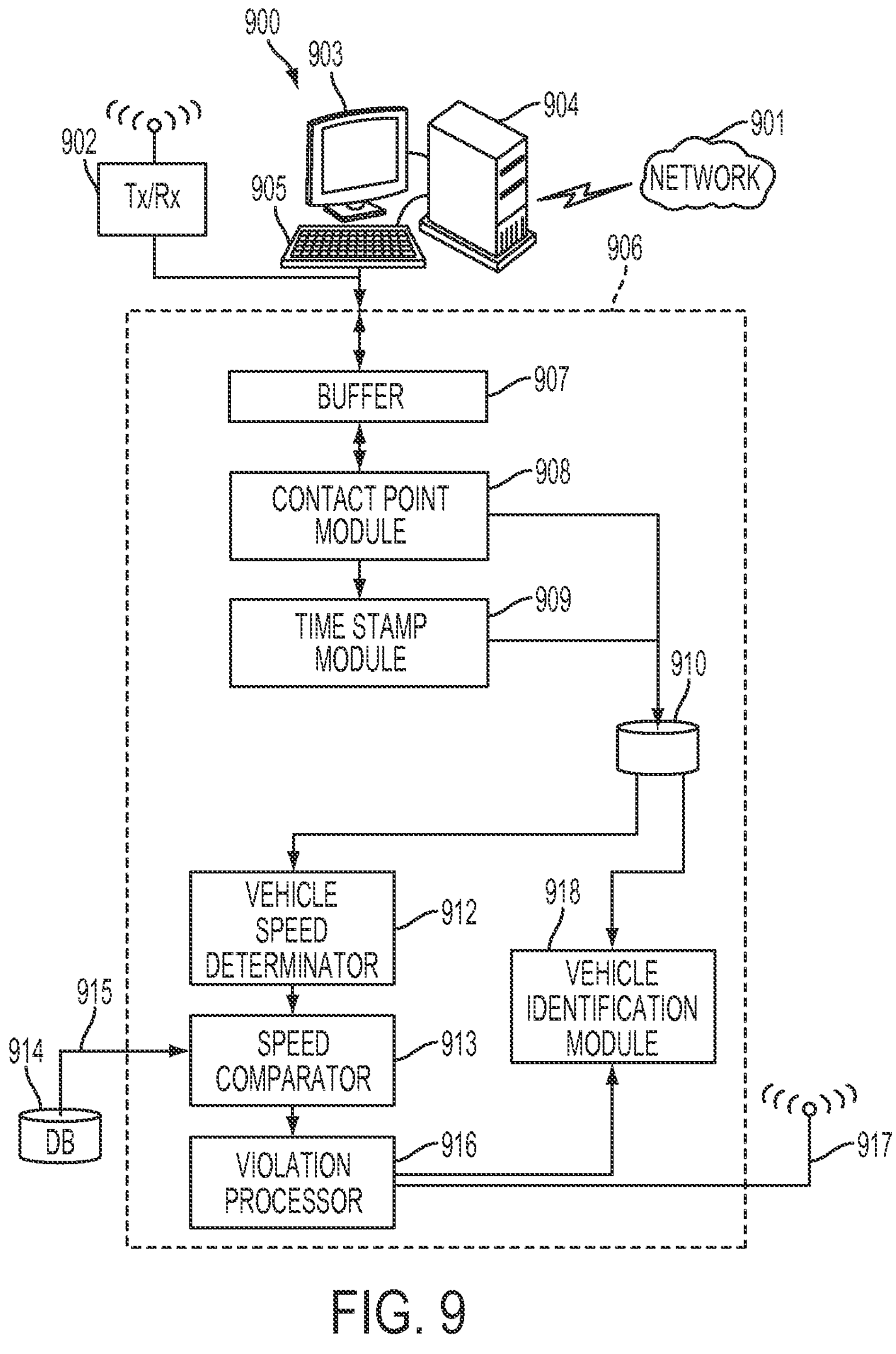
FIG. 9 illustrates a block diagram of one example image processing system for implementing various aspects of the present method shown and described with respect to the flow diagrams of FIGS. 7 and 8.

Reference is now being made to FIG. 9 which illustrates a block diagram of one example image processing system for implementing various aspects of the present method shown and described with respect to the flow diagrams of FIGS. 7 and 8.

Workstation 900 is shown having been placed in communication with transceiver 902 for receiving the captured IR images of FIG. 5 from IR camera system 310 and/or controller 314 of FIG. 4. The captured IR images of the motor vehicle may be stored in a memory or storage device (not shown) which has been placed in communication with workstation 900 or a remote device for storage or further processing over network 901 via a communications interface. The networked workstation 900 of FIG. 9 is shown comprising a computer case 904 which houses a motherboard with a processor and memory, a communications link such as a network card, video card, and other software and hardware needed to perform the functionality of a computing system. Case 904 may further house a hard drive which reads/writes to a machine readable media such as a floppy disk, optical disk, CD-ROM, DVC, magnetic tape, etc. Workstation 900 has an operating system and other specialized software configured for entering, selecting, modifying, and accepting any information needed for processing the image. Default settings and initialization parameters can be retrieved from memory or a storage device as needed. Although shown as a desktop computer, it should be appreciated that workstation 900 can be a laptop, a mainframe, a client/server, or a special purpose computer such as an ASIC, circuit board, dedicated processor, or the like. The embodiment of the workstation of FIG. 9 is illustrative and may include other functionality known in the arts. Computer 900 and Tx/Rx element 902 are in communication with Image Processing Unit 906 which processes the received sequence of time-stamped IR images in accordance with the teachings hereof. Any of the system components of the networked workstation 900 may be placed in communication with image processing system 906 such that information computed or otherwise obtained therein can be viewed on the display. Moreover, the image processing system 906 may optionally be part of the workstation 900.

Image Processing Unit 906 is shown comprising a buffer 907 for queuing received images for processing. Such a buffer may also be configured to store data, formulas, variables and other representations needed to facilitate processing of the received images in accordance with the methods disclosed herein. Contact Point Module 908 receives the captured IR images and, for each image, proceeds to identify a point of contact between the rubber and the road surface using the above-described contrast in the IR image. Example points of contact are discussed with respect to contact points 520, 522 of the images of FIG. 5. The image coordinates of the identified points of contact are determined, and are then converted to real-world coordinates. Time Stamp Module 909 receives the detected points of contacts for each image from Module 908 and proceeds to associate each image's time stamp with each image's respective point of contact in real-world coordinates. Data generated from the Contact Point Module 908 and the Time Stamp Module 909 are stored to storage device 910. Optionally the captured IR images are also stored to storage device 910. Speed Determinator 912 retrieves from storage device 910 the calculated time and distance data, and proceeds to determine the vehicle's speed as it travels down that particular road. As mentioned earlier, the output could be the speed profile and/or at least one of the average, median, maximum, and minimum of the speed profile. Speed Comparator Module 913 obtains the final speed from Determinator 912 and proceeds to compare the vehicle's speed to a speed limit 915 established for this road which it retrieved from database 914. The speed limit for this road can be programmed into a memory in communication with a processor unit (CPU) inside Comparator Module 913 or retrieved from workstation 900 after having been provided by an operator thereof in advance of implementation of the present system. Violation Processor 916 receives a result of the comparison of the vehicle's calculated speed and the speed limit for that particular roadway from Comparator 913 and proceeds to make a determination whether a traffic violation has occurred. If a traffic violation has occurred then Processor 916 initiates identification of the target vehicle. This is performed by the Vehicle Identification module 918, which retrieves one or more of the captured IR images from database 910. These images are processed by an automatic license plate recognition (ALPR) system which automatically extracts a license plate number from one or more of the captured IR images of the target vehicle. Optionally, further vehicle identifying information may be extracted, such as the type, make and/or model of the car. Processor 916 then initiates a signal, via Tx/Rx element 917, to a law enforcement or traffic authority that the target vehicle has been detected to be traveling in excess of the speed limit, along with the determined speed and the vehicle identification provided by the Vehicle Identification module 918. The signal may be automatically sent to a highway patrol car lying in wait which, in response to the signal having been received, proceeds to pull the speeding vehicle over to issue a traffic citation. In another embodiment, the signal is provided to an automated system which computes a traffic violation fine, retrieves name and address information from a database, and mails a ticket to the intended recipient.

It should be appreciated that any of the modules and/or processors of FIG. 9 are in communication with workstation 900 and with storage devices 910 and 914 via communication pathways (shown and not shown) and may store/retrieve data, parameter values, functions, pages, records, data, and machine readable/executable program instructions required to perform their various functions. Each may further be in communication with one or more remote devices over network 901 such as, for example, any of the devices shown and discussed with respect to the embodiment of FIG. 4. Connections between modules and processing units are intended to include both physical and logical connections. It should be appreciated that some or all of the functionality of any of the modules or processing units of FIG. 9 may be performed, in whole or in part, by components internal to workstation 900 or by a special purpose computer system. One example special purpose computer system is shown and discussed with respect to the embodiment of FIG. 10.

It should also be appreciated that various modules may designate one or more components which may comprise software and/or hardware designed to perform the intended function. A plurality of modules may collectively perform a single function. Each module may have a specialized processor capable of executing machine readable program instructions which enable that processor to perform its intended function. A plurality of modules may be executed by a plurality of computer systems operating in parallel. Modules may further include one or more software/hardware modules which may further comprise an operating system, drivers, device controllers, and other apparatuses some or all of which may be connected via a network. It is also contemplated that one or more aspects of the present method may be implemented on a dedicated computer and may also be practiced in distributed computing environments where tasks are performed by remote devices that are linked via a network.

Example Special Purpose Computer

Figure 10:
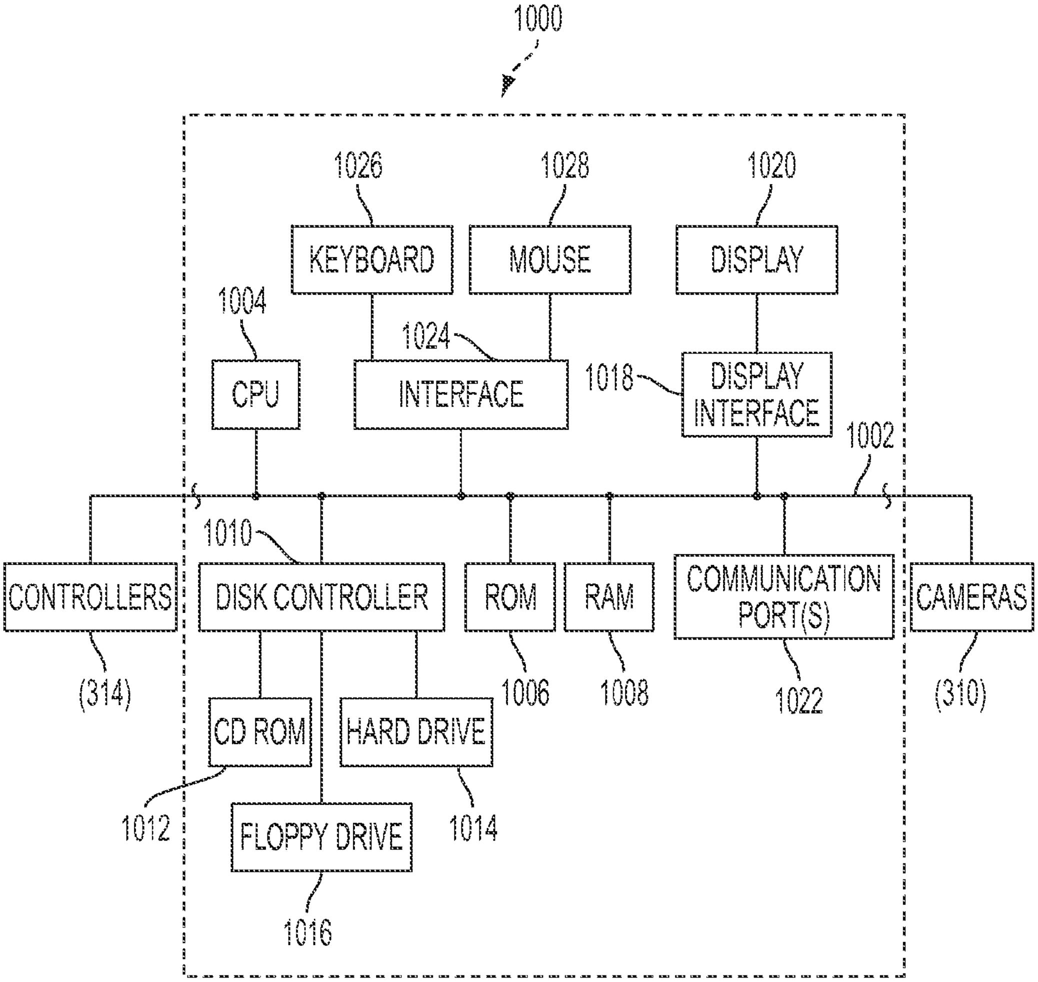
FIG. 10 illustrates a block diagram of an example special purpose computer for implementing various aspects of the present system and method as described with respect to FIGS. 7 and 8, and with respect to the various modules and processing units of the block diagram of FIG. 9.

Reference is now being made to FIG. 10 which illustrates a block diagram of one example special purpose computer for implementing various aspects of the present method as described with respect to the flow diagrams of FIGS. 7 and 8, and the various modules and processing units of the block diagram of FIG. 9. Such a special purpose processor is capable of executing machine executable program instructions and may comprise any of a micro-processor, micro-controller, ASIC, electronic circuit, or any combination thereof.

Special purpose processor 1000 executes machine executable program instructions. Bus 1002 serves as an information highway interconnecting the other illustrated components. The computer incorporates a central processing unit (CPU) 1004 capable of executing machine readable program instructions for performing any of the calculations, comparisons, logical operations, and other program instructions for performing the methods disclosed herein. The CPU is in communication with Read Only Memory (ROM) 1006 and Random Access Memory (RAM) 1008 which, collectively, constitute storage devices. Such memory may be used to store machine readable program instructions and other program data and results. Controller 1010 interfaces with one or more storage devices 1014. These storage devices may comprise external memory, zip drives, flash memory, USB drives, memory sticks, or other storage devices with removable media such as CD-ROM drive 1012 and floppy drive 1016. Such storage devices may be used to implement a database wherein various records of objects are stored for retrieval. Example computer readable media is, for example, a floppy disk, a hard-drive, memory, CD-ROM, DVD, tape, cassette, or other digital or analog media, or the like, capable of having embodied thereon a computer readable program, logical instructions, or other machine readable/executable program instructions or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods herein. Display interface 1018 effectuates the display of information on display device 1020 in various formats such as, for instance, audio, graphic, text, and the like. Interface 1024 effectuates a communication via keyboard 1026 and mouse 1028. Such a graphical user interface is useful for a user to review displayed information in accordance with various embodiments hereof. Communication with external devices may occur using example communication port(s) 1022. Such ports may be placed in communication with the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via communication ports are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite.

It will be appreciated that various of the above-disclosed and other features and functions, or alternatives hereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for reducing speed error in determining the speed of a motor vehicle in a vehicle speed detection system, the method comprising:

receiving a plurality of infrared images of a motor vehicle traveling on a road, each of said images being separated in time by a known interval, said infrared images having been captured using a single camera infrared imaging system operating in an infrared wavelength band spectrum range specifically selected such that a contrast of a point of contact between the tires of said vehicle and the road surface is optimized with respect to road material and tire rubber in said images, said infrared imaging system positioned adjacent the road;

determining, for each of at least two of said images, the point of contact where a same tire of said vehicle contacts said road surface, such that a height of each point of contact is zero;

mapping said points of contact to a (x,y) two dimensional coordinate system, such that each point of contact has a (x,y) set of coordinates;

using said coordinates and said time interval separations to calculate a speed at which said vehicle is traveling on said road; and communicating said vehicle's speed to a computer system; for comparing said vehicle's speed to a speed limit established for said road.

2. The method of claim 1, wherein said infrared imaging system comprises any of a single-band and a multi-band infrared camera.

3. The method of claim 1, wherein said infrared wavelength band includes a portion of the electromagnetic spectrum between 0.7 μm and 9.7 μm in wavelength.

4. The method of claim 1, wherein said images comprise any of:

still images captured at known time intervals, and video images captured at a known frame rate.

5. The method of claim 1, wherein said road surface comprises any combination of: asphalt, concrete, metal, and gravel.

6. The method of claim 1, further comprising calibrating said infrared camera such that pixel locations of said captured images are known relative to real world coordinates.

7. The method of claim 1, further comprising: analyzing more than two images of said vehicle using contact points determined for each of a plurality of images over a plurality of time intervals; and determining at least one of a mean speed, a median speed, a maximum speed and a minimum speed, for said vehicle from said analysis of more than two images.

8. The method of claim 1, further comprising determining a time-varying speed for said vehicle using at least some of said images.

9. The method of claim 1, further comprising initiating an alert signal in response to said vehicle's speed exceeding said speed limit.

10. A system for reducing speed error in determining the speed of a motor vehicle in a vehicle speed detection system, the system comprising:

a single camera infrared imaging system operating in an infrared wavelength band spectrum range specifically selected such that a contrast of a point of contact between tires of said vehicle and a road surface is optimized with respect to road material and tire rubber in said images, said infrared imaging system positioned a processor in communication with said video camera system and a memory, said processor executing machine readable instructions for performing:

receiving infrared images captured using said infrared imaging system, each of said infrared images being separated in time by a known interval;

determining, for each of at least two of said images, the point of contact where a same tire of said vehicle contacts said road surface, such that a height of each point of contact is zero; mapping said points of contact to a (x,y) two dimensional coordinate system, such that each point of contact has a set of (x,y) coordinates; using said coordinates and said time interval separations to calculate a speed at which said vehicle is traveling on said road; and communicating said vehicle's speed to a computer system; for comparing said vehicle's speed to a speed limit established for said road.

11. The system of claim 10, wherein said infrared imaging system comprises any of a single-band and a multi-band infrared camera.

12. The system of claim 10, wherein said infrared wavelength band includes a portion of the electromagnetic spectrum between 0.7 μm and 9.7 μm in wavelength.

13. The system of claim 10, wherein said images comprise any of still images captured at known time intervals, and video images captured at a known frame rate.

14. The system of claim 1, wherein said road surface comprises any combination of asphalt, concrete, metal, and gravel.

15. The system of claim 10, further comprising calibrating said infrared camera such that pixel locations of said captured images are known relative to real world coordinates.

16. The system of claim 10, further comprising: analyzing more than two images of said vehicle using contact points determined for each of a plurality of images over a plurality of time intervals;

and determining at least one of a mean speed, a median speed, a maximum speed and a minimum speed, for said vehicle from said analysis of more than two images.

17. The system of claim 10, further comprising determining a time-varying speed for said vehicle using at least some of said images.

18. The system of claim 10, further comprising initiating an alert signal in response to said vehicle's speed exceeding said speed limit.

19. A computer implemented method for reducing speed error in determining the speed of a motor vehicle in a vehicle speed detection system, the method comprising:

receiving a plurality of infrared images of a moving vehicle, said images captured at known time intervals with each of said images being separated in time by a known interval, said images having been captured using a single camera infrared imaging system operating in an infrared wavelength band spectrum range specifically selected such that a contrast of a point of contact between the tires of said vehicle and the road surface is optimized with respect to road material and tire rubber in said images, said infrared imaging system positioned adjacent the road;

determining, for each of at least two of said images, the point of contact where a same tire of said vehicle contacts said road surface, such that a height of each point of contact is zero;

mapping said points of contact to a (x,y) two dimensional coordinate system, such that each point of contact has a (x,y) set of coordinates;

using said coordinates and said time interval separations to calculate a speed at which said vehicle is traveling on said road; and communicating said vehicle's speed to a computer system;

for comparing said vehicle's speed to a speed limit established for said road.

20. The computer implemented method of claim 19, further comprising calibrating said infrared camera such that pixel locations of said captured images are known relative to real world coordinates.

21. The computer implemented method of claim 19, further comprising:

calculating a plurality of speeds for said vehicle using contact points determined for each of a plurality of images over a plurality of time intervals;

and determining an average speed for said vehicle from said plurality of speeds.

22. The computer implemented method of claim 19, further comprising determining a time-varying speed for said vehicle using at least a portion of said plurality of images.

* * * * *